Feb. 21, 1933.  C. R. BAILEY  1,898,074
ANTIFRICTION BEARING
Filed Aug. 21, 1930   2 Sheets-Sheet 1

INVENTOR
C. R. BAILEY
BY Hazard and Miller
ATTORNEYS

Feb. 21, 1933. C. R. BAILEY 1,898,074
ANTIFRICTION BEARING
Filed Aug. 21, 1930 2 Sheets-Sheet 2

INVENTOR
C. R. BAILEY
BY
*Hazard and Miller*
ATTORNEYS

Patented Feb. 21, 1933

1,898,074

UNITED STATES PATENT OFFICE

CLARENCE R. BAILEY, OF LOS ANGELES, CALIFORNIA, ASSIGNOR TO CAROL SUPPLIES, INC., OF LOS ANGELES, CALIFORNIA, A CORPORATION OF ARIZONA

ANTIFRICTION BEARING

Application filed August 21, 1930. Serial No. 476,735.

This invention relates to antifriction bearings, and has for an object the provision of a novel and unusually efficient type of antifriction bearing adapted to be interposed between two relatively movable members disposed one inside the other, such for example, as a drill stem disposed inside the casing of a well being drilled or between the pump tubing of a well being pumped and the casing of that well.

Another object is to provide an expansible antifriction device of the type indicated, the device being so constructed that it is self-actuated to increase the effective over-all dimensions thereof, thereby permitting the antifriction bearing to accommodate itself to deviations in the inside diameter of the well casing or analogous member within which it is disposed.

A further object is to provide an antifriction bearing having the above described characteristics, which is of relatively simple construction, and the component parts of which are of particularly rugged design, thereby rendering the antifriction bearing capable of performing satisfactorily over a prolonged period of time even though subjected to relatively hard usage such as that frequently encountered in drilling deep wells.

The invention possesses other objects and advantageous features, some of which, with those enumerated, will be set forth in the following description of the invention's particular embodiments which are illustrated in the drawings accompanying and forming a part of the specification.

Referring to the drawings.

Whereas the antifriction bearing of the present invention has been designed primarily for use in eliminating frictional wear between a drill stem and the well casing within which it is reciprocable, or between a pump tubing and its associated well casing, it is of course, equally suited for performing the same function when interposed between substantially any type of members movable with respect to each other and disposed one inside the other. Broadly considered, the antifriction device or spacer of my invention, comprises a plurality of jointed arms mounted upon one of the relatively movable members and spaced angularly about the circumference thereof, and means resiliently pressing the jointed portions of the arms toward or actually into contact with the other of the members. Accordingly, the device is capable of holding the relatively movable members spaced from each other so as to keep them out of frictional engagement with each other. Preferably, therefore, the spacer is provided with antifriction means at the point of contact with the member with respect to which it is movable, so as to extend the period of utility of the device.

Figure 1:
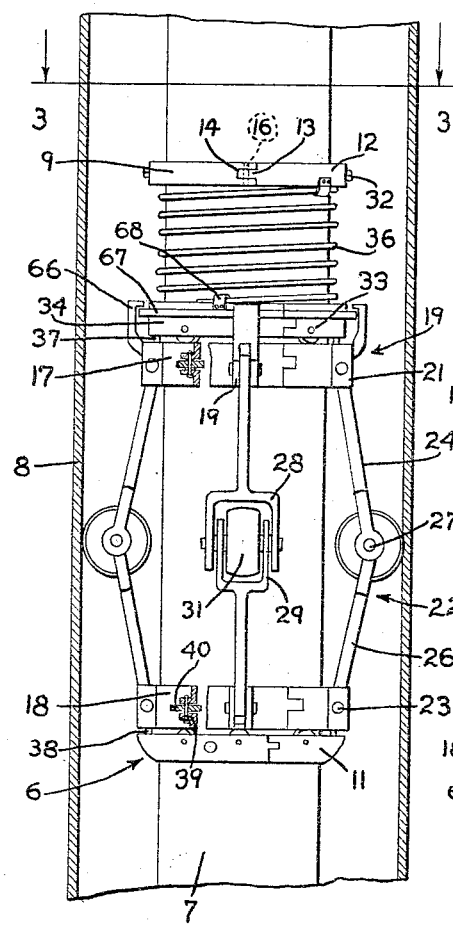
Figure 1 is a vertical sectional view taken through a section of well casing and showing in elevation a section of drill stem disposed thereinside, and an antifriction bearing embodying the principles of the present invention. Portions of the figure are broken away and shown in section to better disclose the construction.
Figure 2:
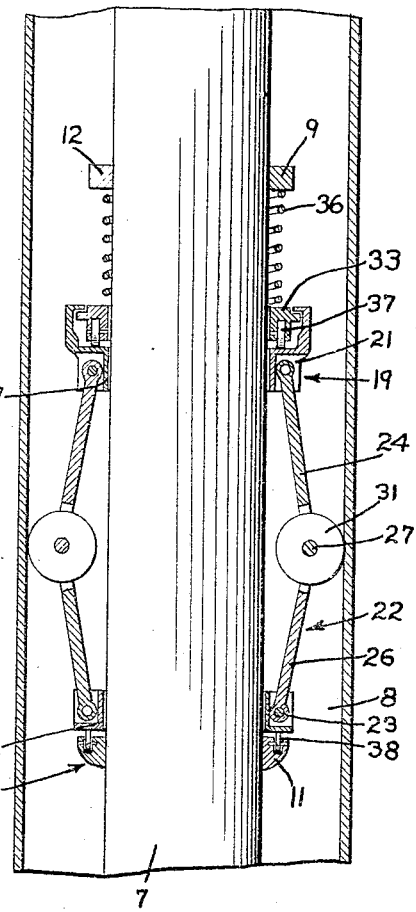
Fig. 2 is a view similar to Fig. 1, this view showing the antifriction bearing in vertical medial section.
Figure 3:
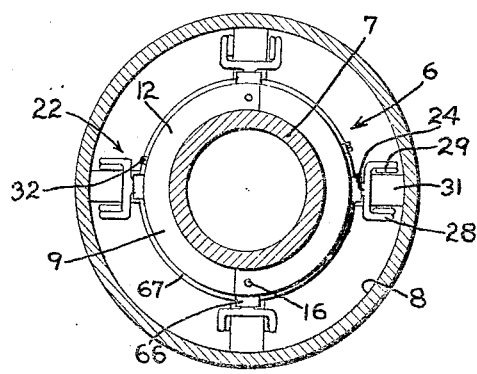
Fig. 3 is a horizontal sectional view taken upon the line 3—3 of Fig. 1, with the direction of view as indicated.

Specifically describing that embodiment of the invention which is illustrated upon Figs. 1 to 3 inclusive, this form of my antifriction bearing or spacer 6, is shown mounted upon a drill stem 7 which is mounted for reciprocation within a well casing 8, in the well-known manner. The spacer 6 comprises a pair of spaced collars 9 and 11 rigidly secured to the drill stem 7. I prefer to form each of the collars 9 and 11 of a plurality, preferably a pair of arcuate sections 12 adapted to be releasably and preferably rigidly joined to form an annular collar, thereby permitting installation of the collar upon the drill stem 7 without the necessity of slipping the collar over an end thereof. Any suitable means may be employed for releasably joining the sections 12 of each collar, such for example, as a tongue 13 formed at one end of each section 12 and extending as a circumferential continuation thereof, to be received within a complementary socket 14 in the associated end of the other section 12. A removable pin or rivet 16 should be inserted into aligned holes in the tongue 13 and the bifurcated end of the other section 12 defining the socket 14 so as to releasably join the sections 12 as will readily be understood.

A pair of annular heads 17 and 18 are revolubly mounted upon the drill stem 7 between the collars 9 and 11. Preferably each of these heads 17, 18, is also composed of a plurality of releasably joined arcuate sections, so as to permit installation of the antifriction device upon the drill stem without having to break the joint between the contiguous stands or sections thereof. A similiar number of pairs 19 of spaced lugs 21 are formed upon each of the heads 17 and 18, these pairs 19 of lugs being disposed at regularly spaced intervals throughout the circumference of their respective heads. These lugs 21 provide means for pivotally mounting jointed arms 22 upon the heads 17 and 18, each of these arms being pivoted at each end to one of the heads. Any suitable type of pin 23 may be employed for pivotally joining one end of each arm 22 to each of the heads 17 and 18, by passing through both lugs 21 of the associated pair 19, and also through the associated end of the arm 22.

Each arm 22 comprises a pair of links 24 and 26 which are pivotally joined to each other by means of a pin 27 or its equivalent. Those ends of the links 24 and 26 of each arm 22 which are pivoted to each other, are bifurcated as indicated at 28 and 29 respectively, thus permitting the installation of an antifriction roller 31 upon each of the pins 27. Whereas any suitable material may be employed for the manufacture of these antifriction rollers 31, I prefer to employ the antifriction material which is disclosed in my copending application, Serial No. 466,494 filed July 8, 1930, this material being composed of alternate layers of relatively soft, resilient material and hard material. For example, the soft, resilient strata may be relatively soft, vulcanized rubber, whereas the hard strata may be the condensation product of formaldehyde and phenol or cresol, known at "bakelite."

Whereas the collars 9 and 11 are intended to be rigidly mounted upon the drill stem 7 as by a plurality of set screws 32 threaded through each of said collars at spaced intervals thereabout, the heads 17 and 18 are so proportioned that they fit relatively loosely about the drill stem 7, thereby permitting free rotation of the collars 17 and 18, carrying with them the arms 22. Spring means are interposed between the upper collar 9 and the upper head 17. For this purpose a third collar 33 also composed of separable sections 34, is disposed between the upper collar 9 and the upper head 17, and a coil spring 36 is under compression between the collars 9 and 33. The collar 33 is of such size that it may move freely longitudinally upon the drill stem 7, so that the spring 36 continually presses it downwards against the upper head 17. Preferably, each of the collars 33 and 11 is provided with a plurality of antifriction rollers 37 and 38 respectively, which make contact with the heads 17 and 18 respectively, so as to reduce the amount of friction present when the heads rotate about the drill stem 7 and with respect to the non-rotatable collars. Also, each of the collars 17 and 18 is provided with a plurality of pairs of lugs 39, and between the lugs of each pair a roller 40 is journalled. Each of the rollers 40 extends through a slot formed in the associated collar between the lugs, so as to make contact with the exterior surface of the stem 7 and thus reduce to a minimum the friction between the stem 7 and the rotatable part of the antifriction bearing.

Since the collar 11 is stationary, holding the lower head 18 against axial movement upon the drill stem 7, the result of the pressure exerted by the spring 36 against the upper head 17, is to continually urge the jointed portions of the arms 22 radially outwards so as to bring the rollers 31 into engagement with the inner circumference of the casing. In this manner, means are provided for resilient spacing of the drill stem 7 within the casing 8, so as to normally retain them in coaxial arrangement with respect to each other, but to permit the drill stem 7 to move slightly from coaxial arrangement inside the casing 8 when any unusual stresses are encountered. Moreover, the rollers 31 are continually urged outwards so that the antifriction device is capable of fitting itself to the interior of the casing 8 through any changes in the inside diameter thereof. Should it happen that the drill stem 7 should be lowered within the casing 8 far enough to permit one or more of the antifriction devices 6 to pass the lower end of the casing 8, the action of the spring 36 would, under such circumstances, press the rollers 31 outwards far enough to make contact with the wall of the well bore, provided the diameter of the bore were not greater than the maximum effective outside diameter of the antifriction device 6. Even though the diameter of the well bore is found to be greater than the maximum effective diameter of the antifriction device, the antifriction device would be capable of keeping the drill stem 7 from making contact with the well bore, because one or more of the rollers 31 will come into engagement with the wall of the bore before the drill stem 7 can make such engagement therewith.

Since the rollers 31 are journalled on their respective pins 27, the drill stem 7 may move vertically within the casing 8, with the development of substantially no friction therebetween, because of the rolling engagement which the rollers 31 establish with the inside circumference of the casing 8. Furthermore, rotation of the drill stem 7 within the casing 8, will develop little or no friction because of the fact that the heads 17 and 18 which carry the arms 22, are rotatable with respect to the drill stem 7 and the collars 11 and 17.

The fact that the maximum effective diameter of the antifriction bearing is not fixed, is a decided improvement over antifriction bearings which are not yieldable, because it tends to reduce the strains to which the drill stem 7 is subjected during the drilling process. As is well known, it is practically impossible to drill a deep well with a perfectly straight bore. Hence, the casing 8 will have bends therein at different points throughout its length. Owing to the fact that the casing 8 is stationary within the well, after having once been installed, these bends are not of very great importance considered from the standpoint of the casing alone. However, the drill stem 7 is continually rotated within the casing 8, with the result that wherever a bend occurs within the casing, the drill stem 7 is continually subjected to bending back and forth in addition to the wearing action which is present when the drill stem rubs against the casing. Obviously, the provision of antifriction devices which hold the drill stem and casing in coaxial alignment, increases the amount of bending to which the drill stem is subjected during its rotation, because they impose a bend upon the drill stem, of approximately the same magnitude as that which is formed in the casing 8. However, a yieldable antifriction device such as that described hereinabove, will materially decrease the amount of bending in the drill stem by permitting the drill stem to position itself more closely to that portion of the casing which defines the inside of the bend therein, even though the antifriction device is capable of keeping the drill stem and casing out of actual frictional engagement.

Figure 4:
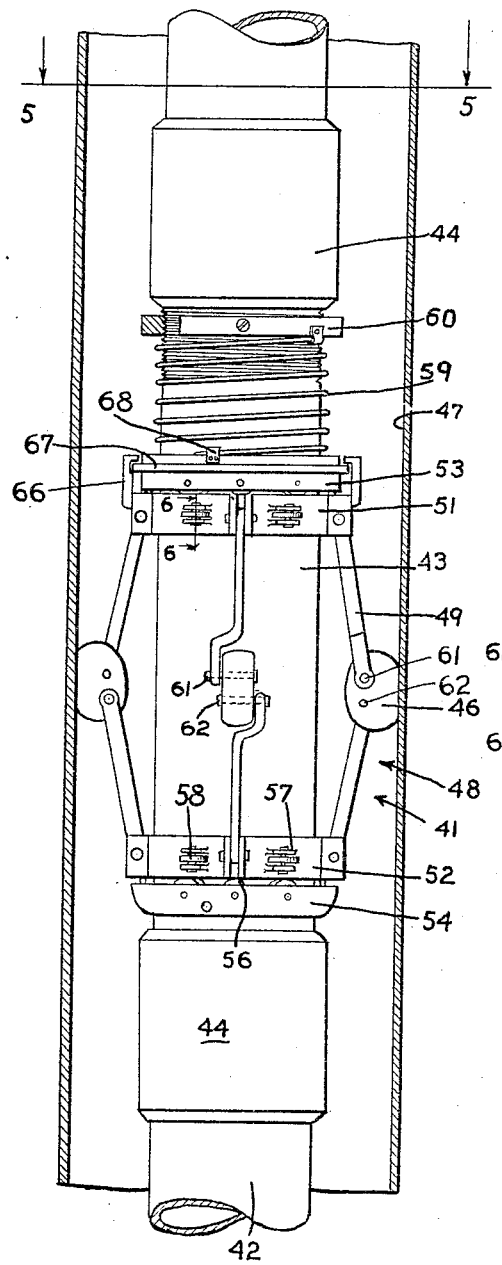
Fig. 4 is a view similar to Fig. 1, but showing a slightly modified form of antifriction bearing.
Figure 5:
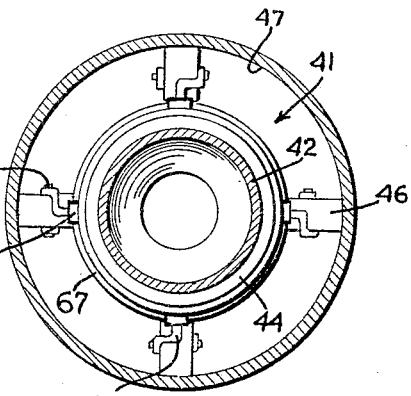
Fig. 5 is a horizontal sectional view taken upon the line 5—5 of Fig. 4, with the direction of view as indicated.
Figure 6:
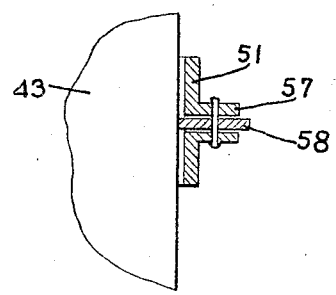
Fig. 6 is an enlarged detail view taken in vertical section on the line 6—6 of Figure 4, with the direction of view as indicated.

Inasmuch as the most pronounced motion of the drill stem within the casing, is rotation, I have provided a slightly modified form of antifriction device indicated in its entirety at 41, this modification being illustrated upon Figs. 4 and 5. The antifriction device 41, instead of being mounted upon one of the conventional stands 42 of the drill stem, is mounted upon a relatively short length 43 which is adapted to be interposed between two adjacent stands 42 by use of the conventional sleeves or couplings 44. This arrangement permits assembling the antifriction device 41 upon the relatively short length 43 which may subsequently be installed into the drill stem, thus effecting a material saving in time in the assembly of the drill stem in the field.

The antifriction device 41 is similar to the modification previously described, with the exception that instead of employing rollers 31 at the jointed portion of each of the arms, it is provided with blocks or slips 46 adapted to slide over the interior circumference of the casing 47. The arms 48 upon which the blocks 46 are carried, are each made up of a pair of links 49. The upper link 49 is pivoted to an upper head 51, and the lower link is pivotally connected to a lower head 52, these heads being similar to the heads 17 and 18 respectively, of the previously described modification. Moreover, the heads 51 and 52 and the arms 48 carried thereby, are retained between a slidable collar 53 and a fixed collar 54, antifriction rollers 56 being employed therebetween to permit the heads 51 and 52 to rotate upon the length 43 of drill stem. Antifriction rollers 57 are also interposed between the length 43 of drill stem and the rotatable collars 51 and 52, the rollers 57 being mounted between lugs 58 in substantially the same manner as the rollers 40 of the previously described modification. A coil spring 59 is under compression between an upper fixed collar 60 and the slidable collar 53, so as to impose pressure upon the upper end of the rotatable head 51, and thereby press the slips 46 outwards into engagement with the casing 47.

I prefer to connect the upper and lower links 49 of each arm 48, to the associated slip or block 46, by means of upper and lower pins 61 and 62 respectively. Inasmuch as these pins 61 and 62 are not in axial alignment, the tendency for the block 46 to rotate thereupon, is overcome, thus causing the block 46 to slide over the surface of the casing 47 with which it is in contact when the drill stem moves axially thereinside.

Means are provided in each of the above described modifications, for supporting the upper rotatable collar 17 or 53 as the case might be, from the upper fixed collar 12 or 60 respectively. A plurality of hook-shaped brackets 66 are rigid with the upper rotatable collar and extend over an annular flange 67 on the collar 33, 53 of the first or second modification respectively, and the spring 36, 59 is secured to the collar 33 or 53 respectively, by a hooked plug 68, so that the upper rotatable collar is suspended from the upper fixed collar by means of the associated spring and the hooked brackets 60. This will permit the rotatable element of the antifriction bearing to rotate freely, but will prevent the upper rotatable collar thereof, from dropping far enough to bring the upper and lower links of each of the jointed arms so close together that it would be impossible for the arms to return to proper position when the antifriction device is again raised into the well casing subsequent to having been lowered beyond the lower end thereof. If such suspension means were not provided and the drill stem 7 or 42, as the case might be, were lowered far enough to permit the antifriction bearing to pass the extreme lower end of the casing, the links of each of the jointed arms would assume substantially horizontal positions, whereupon it would be impossible to again raise the antifriction device into the casing without injury thereto. However, under the present arrangement, each of the springs 36 and 59, is of such proportions that it prevents the associated upper rotatable collar from dropping beyond that position in which the associated upper links of the jointed arms are inclined upwards and inwards at a sufficient angle, even though the rollers 31 or the blocks 46 respectively, are not in engagement with the bore of the casing to develop a wedging action when the antifriction device is again raised into the casing, and squeeze the jointed arms inwards as will readily be understood.

It is to be understood that the details of the invention as herein disclosed, are subject to alteration within the spirit or scope of the appended claims.

I claim:

1. A spacer for a column movably disposed within a casing, comprising a plurality of jointed arms, means for mounting said arms in angularly spaced relationship about said column, means pressing one end of each arm toward the other end thereof, and antifriction means carried by each of said arms at the joint therein.

2. A spacer for a column movably disposed within a casing, comprising a plurality of jointed arms, means mounting said arms revolubly upon said column in angularly spaced relationship thereabove, means pressing one end of each of said arms toward the other end to force the jointed portion thereof outwards into engagement with said casing, and antifriction means carried by each of said arms at said jointed portion thereof.

3. An antifriction device comprising a pair of spaced heads, a plurality of arms pivoted at each end to one of said heads, each arm comprising a pair of links pivoted to each other, means urging one of said heads toward the other to press the pivotally joined portions of said links outwards, and antifriction means at the pivotally joined portion of each of said arms.

4. An antifriction device for a column movably disposed within a casing, comprising a pair of spaced annular heads revolubly mounted on said column, a plurality of arms pivoted at each end to one of said heads, each arm comprising a pair of links pivoted to each other, means urging one of said heads toward the other to press the pivotally joined portions of said links outwards against said casing, and antifriction means at the pivotally joined portion of each of said arms.

5. An antifriction device for a column movably disposed within a casing, comprising a pair of spaced collars rigid with said column, a pair of spaced heads revolubly disposed on said column between said collars, a plurality of arms pivoted at each end to one of said heads, each arm comprising a pair of links pivoted to each other, and spring means under compression between one of said heads and one of said collars and urging the pivotally joined portions of said arms outwards against said casing.

6. An antifriction device for a column movably disposed within a casing, comprising a pair of spaced collars rigid with said column, a pair of spaced heads revolubly disposed on said column between said collars, a plurality of arms pivoted at each end to one of said heads, each arm comprising a pair of links pivoted to each other, spring means under compression between one of said heads and one of said collars and urging the pivotally joined portions of said arms outwards against said casing, and antifriction means interposed between the other head and collar.

7. An antifriction device for a column movably disposed within a casing, comprising a pair of spaced collars rigid with said column, a pair of spaced heads revolubly disposed on said column between said collars, a plurality of arms pivoted at each end to one of said heads, each arm comprising a pair of links pivoted to each other, spring means under compression between one of said heads and one of said collars and urging the pivotally joined portions of said arms outwards against said casing, and antifriction means at said pivotally joined portions of said arms.

8. An antifriction device for a column movably disposed within a casing, comprising a pair of spaced collars rigid with said column, a pair of spaced heads revolubly disposed on said column between said collars, a plurality of arms pivoted at each end to one of said heads, each arm comprising a pair of links pivoted to each other, spring means under compression between one of said heads and one of said collars and urging the pivotally joined portions of said arms outwards against said casing, antifriction means interposed between the other head and collar, and antifriction means at said pivotally joined portions of said arms.

9. An antifriction device for a column movably disposed within a casing, comprising a pair of spaced collars rigid with said column, a pair of spaced heads revolubly disposed on said column between said collars, a plurality of arms pivoted at each end to one of said heads, each arm comprising a pair of links pivoted to each other, spring means under compression between one of said heads and one of said collars and urging the pivotally joined portions of said arms outwards against said casing, and a roller journalled at said pivotally joined portion of each of said arms.

10. An antifriction device for a column movably disposed within a casing, comprising a pair of spaced collars rigid with said column, a pair of spaced heads revolubly disposed on said column between said collars, a plurality of arms pivoted at each end to one of said heads, each arm comprising a pair of links pivoted to each other, spring means under compression between one of said heads and one of said collars and urging the pivotally joined portions of said arms outwards against said casing, antifriction means interposed between the other head and collar, and a roller journalled at said pivotally joined portion of each of said arms.

In testimony whereof I have signed my name to this specification.

CLARENCE R. BAILEY.